US006850553B1

United States Patent
Waschka et al.

(10) Patent No.: US 6,850,553 B1
(45) Date of Patent: Feb. 1, 2005

(54) CHIRP SLOPE MULTIPLE ACCESS

(75) Inventors: G. Alton Waschka, Melbourne, FL (US); Robert Boyd, Rogersville, TN (US)

(73) Assignee: Harris Corporation, Melbourne, FL (US)

(*) Notice: Subject to any disclaimer, the term of this patent is extended or adjusted under 35 U.S.C. 154(b) by 0 days.

(21) Appl. No.: 09/527,194

(22) Filed: Mar. 17, 2000

(51) Int. Cl.⁷ .................. H04B 15/00; H04K 1/00; H04L 27/30
(52) U.S. Cl. .................. 375/139; 342/463; 342/132
(58) Field of Search .................. 375/139; 359/154; 342/463, 132

(56) References Cited

U.S. PATENT DOCUMENTS

| | | |
|---|---|---|
| 3,484,693 A | 12/1969 | Fong |
| 4,275,398 A | 6/1981 | Parker et al. |
| 4,438,519 A | 3/1984 | Bose |
| 4,688,251 A | 8/1987 | Citron et al. |
| 5,022,046 A | 6/1991 | Morrow, Jr. |
| 5,053,782 A * | 10/1991 | Levinberg et al. .......... 342/352 |
| 5,105,294 A | 4/1992 | Degura et al. |
| 5,506,864 A | 4/1996 | Schilling |
| 5,515,396 A | 5/1996 | Dalekotzin |
| 5,561,686 A * | 10/1996 | Kobayashi et al. ......... 375/134 |
| 5,592,180 A | 1/1997 | Yokev et al. |
| 5,859,613 A * | 1/1999 | Otto .......................... 342/463 |
| 5,982,808 A * | 11/1999 | Otto .......................... 375/139 |
| 6,049,563 A * | 4/2000 | Matsui ....................... 375/139 |
| 6,252,882 B1 * | 6/2001 | Matsui ....................... 370/441 |
| 6,466,609 B2 * | 10/2002 | Koslar et al. ............... 375/139 |
| 6,600,774 B1 * | 7/2003 | Otto .......................... 375/139 |

* cited by examiner

Primary Examiner—Phuong Phu
(74) Attorney, Agent, or Firm—Duane Morris LLP

(57) ABSTRACT

In a chip radio communication system, a novel technique for increasing the number of transmitters, or users, that can be simultaneously accommodated in the communication system and the data capacity of the system without increasing frequency bandwidth. A system may include plural transmitters, receivers, and a central station for establishing chirp radio communications. Each receiver may discriminate between chirp radio transmitter type based on the differing chirp signal characteristics.

18 Claims, 3 Drawing Sheets

CHIRP SLOPE MULTIPLE ACCESS

BACKGROUND OF THE INVENTION

The present invention relates to chirp radio communication systems and, more specifically, the invention relates to increasing the number of transmitters, or users, that can be simultaneously accommodated in the communication system and the data capacity of a chirp radio communication systems without requiring additional radio frequency bandwidth.

Many radio communication systems require predetermined bands of radio frequency for accomplishing communications. The frequency bandwidth required for accomplishing communications depends on a plurality of factors. A primary factor is the required data capacity of the communication system. In a chirp radio communication system, a choke-point for data capacity is typically the ability of the system to correlate and detect chirp signals.

In general, increasing frequency bandwidth increases data capacity and allows more users to be simultaneously accommodated in the communication system. However the amount of radio frequency available for public use is limited. The available radio frequencies may be regulated and licensed by the U.S. Government. Regulations may limit the acquisition and licensing of frequency bands. In addition, the cost of acquiring frequencies appears to have substantially increased over the years.

Accordingly, it is an object of the present invention to provide a novel method for increasing data capacity of the communication system without requiring additional bandwidth.

It is another object of the present invention to provide a novel system for increasing the number of transmitters or users that can be simultaneously accommodated in the communication system operating within a geographic area without increasing frequency bandwidth.

It is yet another object of the present invention to provide a novel chirp radio communication having plural transmitters transmitting chirp radio signals of different slopes as a method of increasing the data capacity.

These and many other objects and advantages of the present invention will be readily apparent to one skilled in the art to which the invention pertains from a perusal of the claims, the appended drawings, and the following detailed description of the preferred embodiments.

DESCRIPTION OF PREFERRED EMBODIMENTS

Figure 1:
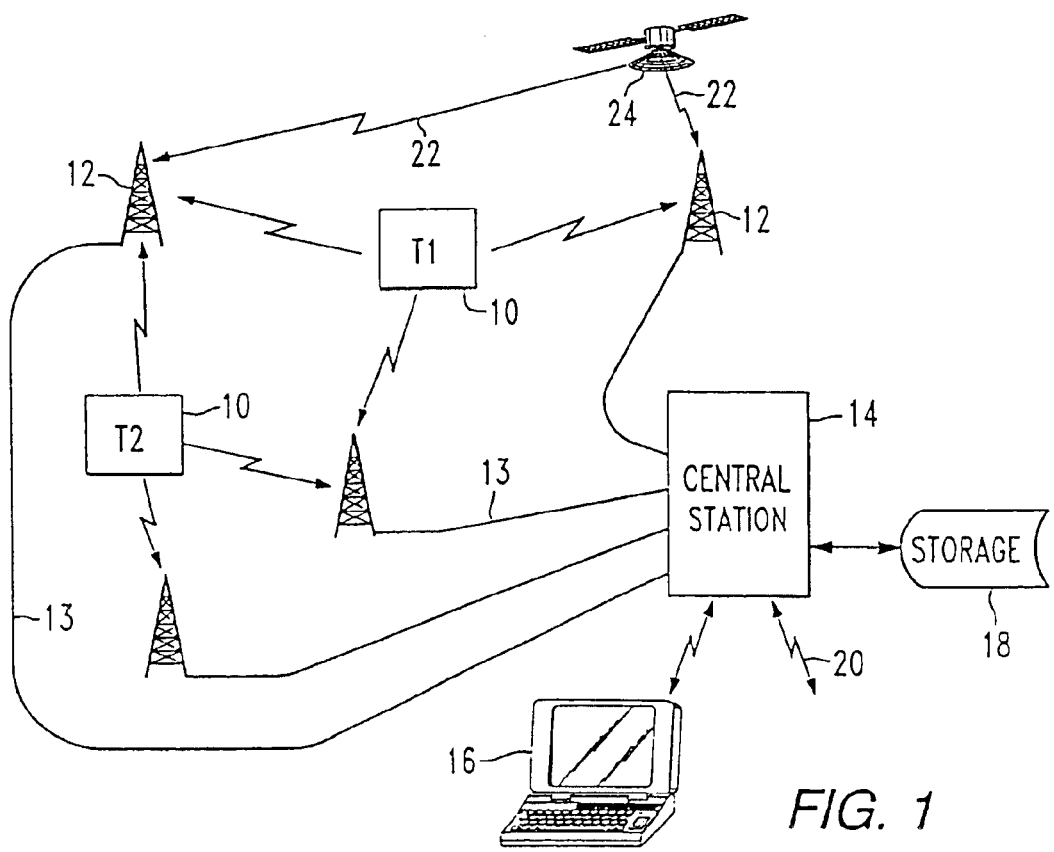
FIG. 1 is a simplified pictorial representation of a communication system in which the present invention may be used.

With reference to FIG. 1, a chirp radio communication system may include plural transmitters 10, which may be stationary or mobile, which are in communication with one or more receiving stations or base stations 12. The receiving stations 12 may communicate with a central station 14. This communication may be by way of conventional telephone circuits 13. The central station 14 may include a control console 16, a storage unit 18, and means for communicating 20 with other central stations 14 or external systems. A common clock signal 22 may be provided by a geostationary satellite system to each of the base stations 12.

In operation, the transmitters 10 may periodically or aperiodically transmit a beacon or signal to the base station (s) 12 within the range of its transmitted signal. The receiving station(s) 12 may receive the beacon signal from the transmitters 10 and may associate with such signals a time of arrival. Information regarding the signal which was received and the time of its arrival may be communicated by the receiving station(s) 12 through conventional means to a central station 14. The receiving station(s) 12 may be coordinated in time through the receipt of a clocking signal 22 from a common source, such as the satellite system 24.

The signals transmitted by the transmitters 10 may include an identification of the specific transmitter 10 which sent the signal, an indication that one or more events have occurred at the transmitter 10, a data portion relating to an activity or condition at the transmitter 10 (such as, without limitation, a temperature, a flow rate, a pressure reading, etc.), an indication that emergency assistance is required at the transmitter 10, and practically any other condition, indication, information, or circumstance which may be digitally encoded.

When the signals transmitted by the transmitters 10 are received at the receiving stations 12, information regarding the signals and their times of arrival may be communicated to the central station 14 for further analysis. Depending upon the type(s) of signals being communicated, the central station 14 may store related information on the storage unit 18, may transmit information regarding the signals to other central stations 14 or to other systems (not shown).

For example, if the signals represent events which have occurred at a transmitter 10, information regarding the occurrence (and time) of the event may be sent to another system for operations or control purposes. Such a system could include a detector which detects an improper entry into a building and triggers an event signal at a transmitter 10. When the entry event is received by the central station 14, the central station 14 may notify a local police department of the event and the location of the transmitter 10 for appropriate police response.

For another example, the signals could include data from a medical sensor attached to a user of the transmitter 10. When passed to the central station 14, the signals could be used to determine the present health of the user or to record (using the storage unit 18) the physical characteristics of the user over time. If the user's health were determined to need assistance, the signals from the receiving stations 12 could be analyzed to determine the geolocation of the user so that medical personnel could be directly dispatched. Finally, the signals could merely identify the transmitter 10 and its location. Such a system could be used, for example, to monitor the instantaneous or history of the location of each truck in a fleet of delivery trucks.

Figure 2:
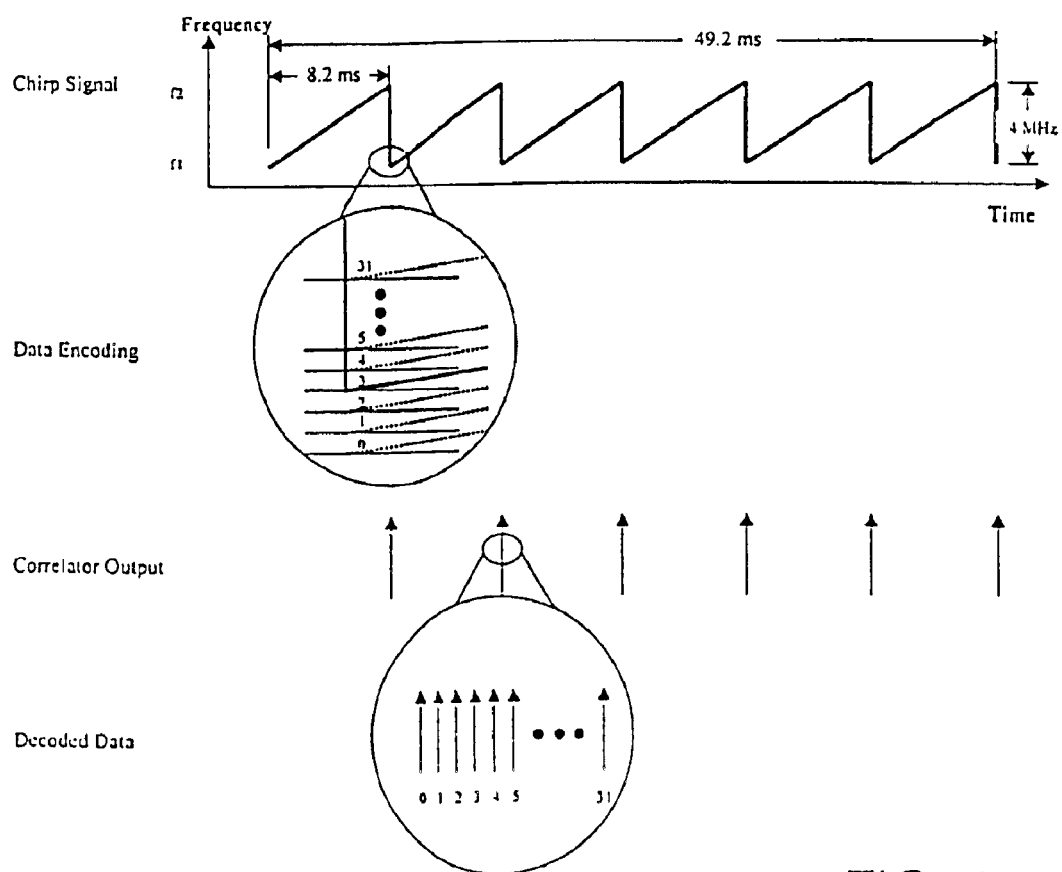
FIG. 2 is a timing diagram illustrating an encoding technique which may be used in a system of the present invention.

The signals from the transmitters 10 may have been encoded with digital information (signifying the identification of the transmitter, events, data, etc.). A method of encoding data on the chirp waveform for this embodiment is depicted in FIG. 2. It is to be understood that the particular frequencies, times, number of starting points to each chirp, the number of chirps in the series, etc. in the following embodiment are illustrative only and are not intended to limit the scope of the invention. The transmitter sends a series of six chirps (which are simply a linear sweep from one frequency to another) nominally from f1 to f2, a bandwidth of approximately 4 MHz. Each chirp occurs in 8.192 milliseconds. The total time occupied by the waveform is therefore 49.152 milliseconds and the sweep rate is 0.5 MHz per millisecond or 500 Hz per microsecond.

Data is encoded on the waveform by starting the second and subsequent chirps in the series (the "subsequent chirps") at frequencies that may be different from the nominal frequency by a specific amount depending on the data to be encoded. The encoding technique assigns one of 32 possible starting points to each subsequent chirp, thus conveying 5 bits of digital data ($2^5=32$) in each subsequent chirp. The increment of the offset for the starting points is chosen as 1 kHz, which represents 2 microseconds at the sweep rate of the chirp. Therefore, each of the subsequent chirps in the series are started at a frequency of $f_s=f1+(m*1 \text{ kHz})$ where m is a value from 0 to 31 representing the desired 5-bit symbol. The value of m can be the same or different for each of the subsequent chirps.

The chirp waveform can be received by a correlator which acts as a matched filter by comparing the value of each sample of the received waveform to the desired waveform and outputs a numerical value equal to the number of samples that matched the desired waveform. It is a property of such receivers that the correlation of a chirp with a time shifted value of itself is poor. Thus the output of the correlator resembles a series of spikes which occur at the point that the incoming waveform best aligns with a replica of the transmitted chirp. This spike occurs at different times depending on the starting frequency of the transmitted chirp. In this example, the spikes occur at a time $t=((n-1)*8.192$ milliseconds$-m*2$ microseconds) where n is the number of the chirp and m is the transmitted symbol for the chirp n. By measuring the time delay from the spike indicating correlation of the first or reference chirp to the spikes for each of the subsequent chirps, the value of the symbol transmitted in each of the subsequent chirps and the corresponding binary data can be recovered.

Figure 3:
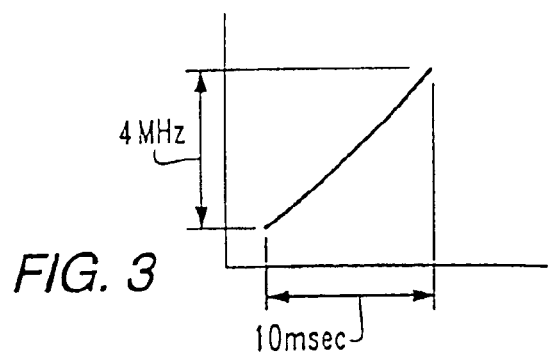
FIG. 3 is a graph illustrating a chirp signal which may be used in a system of the present invention.

With reference to FIG. 3, a chirp signal as used herein is a signal having a continuously varying frequency over a finite period of time. As depicted in FIG. 3, a chirp signal used in the present invention may be a signal having 4 MHz bandwidth which is swept over an 8 millisecond period. While the sweep of the chirp is shown in FIG. 3 as being upward over time, the present invention is not so limited and the chirp may sweep downward in frequency. It is also desirable that the sweep be linear, that is, the plot of the frequency of the signal over time is a straight line. The use of a linear sweep permits the receiver of the signal to use a time invariant matched filter to decode the transmitted signal, even with a signal that has a relatively large frequency offset. Thus, the transmitter may be built using a relatively inexpensive timing source, such as an inexpensive oscillator with poor frequency stability and the system will perform satisfactorily.

As will be recognized by those skilled in the art, the exact timing of the length of the chirps, the number of chirps in a group, the number of bits encoded by the frequency used in initiation of a chirp, or the amount of delay induced in the detection of a chirp associated with a particular bit sequence are not limited to the times and numbers used in the exemplary embodiment and can be set to any practical values depending upon the sensitivity and accuracy of the transmitting and receiving equipment.

Three copending applications disclose means for transmitting, receiving, processing chirp signals, locating transmitters, and other functions in one technique for chirp radio communication systems. These three applications are: "A System and Method For Communicating With Plural Remote Transmitters," Ser. No. 08/708,031; "A System and Method For Geolocating Plural Remote Transmitters", Ser. No. 08/705,831; and, "A System and Method For Communicating and/or Geolocating Plural Remote Transmitters Using A Time Invariant Matched Filter," Ser. No. 08/708,030. Each of the other applications is herein incorporated by reference.

Figure 4:
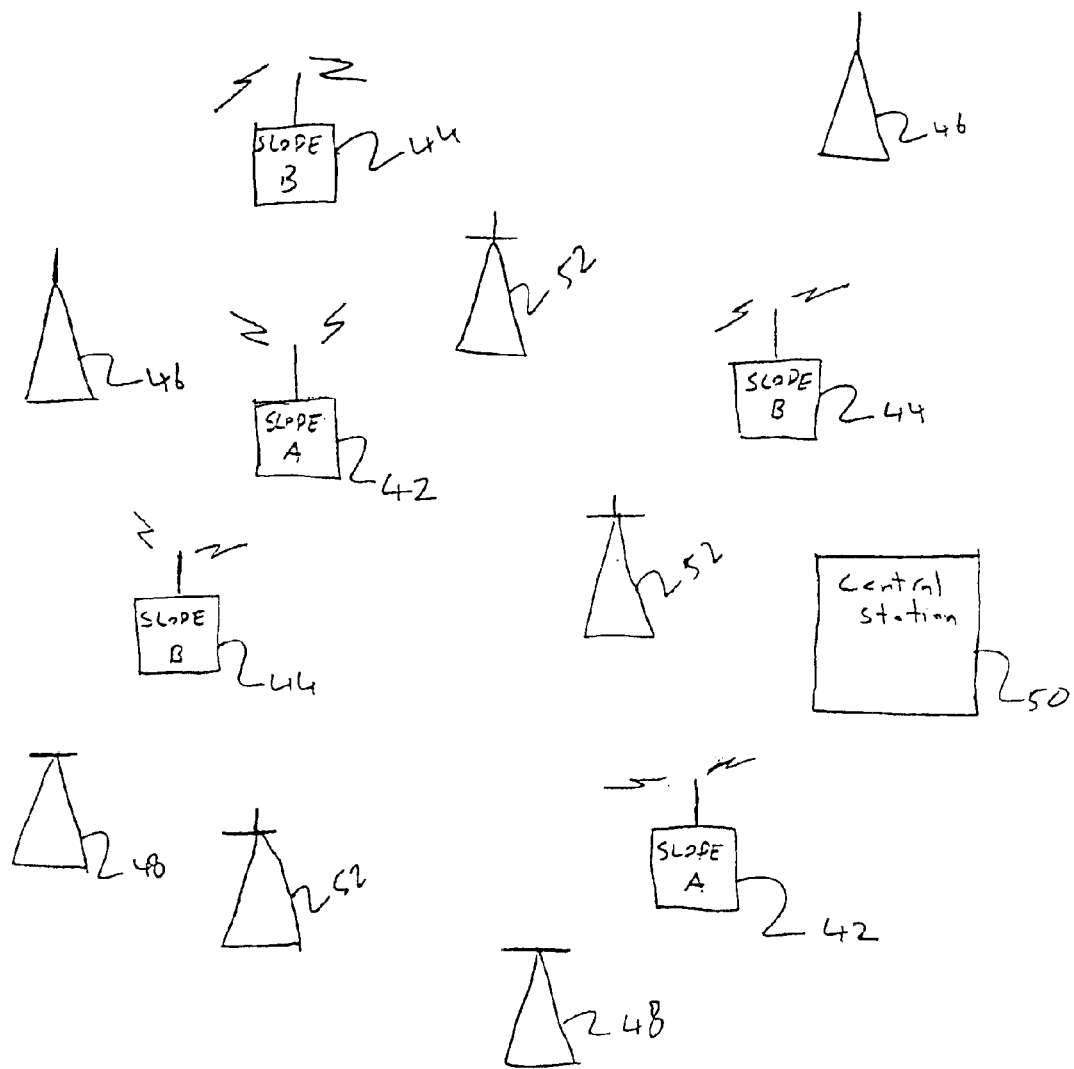
FIG. 4 is functional block diagram illustrating a technique for discriminating among transmitter types in a system of the present invention.

With reference to FIG. 4, a chirp radio communication system may include plural transmitters or tags of a first type 42, plural transmitters or tags of a second type 44, plural receiving stations or base stations of a first type 46, plural receiving stations or base stations of a second type 48, and a central station 50. The receiving stations of the first type and the second type may be co-located in a combined receiving station 52. As discussed above, the receiving stations 46, 48, and 52 may be in communication with the central station 50. Plural central stations may be located in a geographic area to communicate with different types of receiving stations. A difference in type may indicate a difference in chirp signals.

In operation, transmitters of the first type may transmit chirp signals having a first slope and transmitters of the second type may transmit chirp signals having a second slope. The first slope may be different from the second slope in magnitude and/or polarity (e.g., the sweep of a first chirp signal may be upward over time as in FIG. 3, and the sweep of a second chirp signal may be downward in frequency). Preferably, the first slope is of the same magnitude and of opposing polarity as the second slope (i.e., opposing slopes). Preferably, the chirps signals sweep over the entire frequency band of the communication system.

The receiving stations of the first type 46 may include correlators for detecting the magnitude and polarity of chirp signal having the first slope. The receiving stations of the second type 48 may include correlators for detecting the magnitude and polarity of chirp signals having the second slope. Preferably, the correlators in the receiving stations may discriminate between two types of chirp signals by detecting the chirp signal polarity.

Combined receiving stations 52 may include two separate correlators for independently detecting the first and second slopes. A receiving station of either type 46 or 48 may be designed to be expandable into a combined receiving station so that correlators for differing chirp signal may operate from the same antenna. The correlators in a combined receiving station may feed a single communications processor which effectively doubles system capacity with a modest infrastructure increase. All of the receiving stations may communicate with a single central office 50. Alternatively, two central stations may operate separately to process chirp signals transmitted by the two types of transmitters.

Together, the transmitters of the first type 42, the receiving stations of the first type 46, and a central station may be considered to be a first chirp radio communication network and the transmitters of the second type 44, the receiving stations of the second type 48, and a second or co-located central stations may be considered to be a second chirp radio communication network. Transmitters in one network will not be recognized by the other network. The first and second chirp radio communication networks may include combined receiving stations 52. One of the two networks may be "open" and the other "closed." "Open" may indicate that a chirp radio communication service is provided by subscription and "closed" may indicate that a chirp radio communication service that is provided for a specific customer or set of customers. "Open" and "closed" may also indicate a distinction between national and local services.

A national system may allow roaming and must provide enough "address space" for a nationwide customer base which limits the data space. A local service may require a smaller "address space" and allow higher data transfer.

The use of two chirp signals provides a simple means for sharing the load in a network by only increasing processor requirement and re-using antenna equipment, communications processor, and possibly a location processor at each receiving station. If one chirp signal increases over time and the other decreases over time, then the two of types of transmitters may coexist in the same network with a modest increase in equipment at each site or multiple networks may be established based on types of transmitters.

While preferred embodiments of the present invention have been described, it is to be understood that the embodiments described are illustrative only and the scope of the invention is to be defined solely by the appended claims when accorded a full range of equivalence, many variations and modifications naturally occurring to those of skill in the art from a perusal hereof.

What is claimed is:

1. In a multiple access chirp radio communication system, a method of discriminating between plural types of mobile transmitters transmitting chirp signals of different slopes within a same frequency range comprising the steps of:
    (a) encoding data on a series of chirps signals by starting a second chirp and subsequent chirps of the series of chirp signals a=t frequencies different from a nominal frequency by a specific amount,
    (b) transmitting the series of chirp signals from one of the plural type of mobile transmitters, wherein the series of chirp signals have a slope associated with the respective on of the plural type of transmitters;
    (c) receiving the chirp signal;
    (d) detecting the slope of the received chirp signal; and
    (e) determining mobile transmitter type as a function of the detected chirp slope.

2. The method of claim 1 further comprising the step of asynchronously transmitting chirp signals in a geographic area.

3. The method of claim 1 wherein transmitter type is determined as a function of the magnitude of the detected chirp slope.

4. The method of claim 1 wherein transmitter type is determined as a function of the polarity of the detected chirp slope.

5. The method of claim 1 wherein transmitter type is determined as a function.

6. In a multiple access chirp radio communication system for transmitting and receiving a first type of chirp signal of a first predetermined slope, the first predetermined slope continuously increasing in frequency band during a predetermined amount of time, wherein data is encoded by an offset of the starting frequency of a subsequent chirp, the improvement comprising transmitting and receiving a second type of chirp signal having a different slope from the first predetermined slope over the predetermined frequency band in the same geographic coverage area, whereby the data capacity of the system is significantly increased without increasing the first predetermined frequency band.

7. The system of claim 6 wherein the different slope is continuously decreasing in frequency over the predetermined frequency band during the predetermined amount of time.

8. The system of claim 6 wherein the slope of the second chirp signal opposes the first predetermined slope.

9. The system of claim 6 wherein the first chirp signal and the second chirp signal are being asynchronously transmitted.

10. A method of increasing the number of users that can be simultaneously accommodated in a multiple access chirp radio communication system comprising the steps of:
    (a) transmitting and receiving a first chirp signal of a first predetermined slope over a predetermined frequency band; and,
    (b) transmitting and receiving a second chirp signal over the predetermined frequency band in the same geographic area, the second chirp signal having a different slope for the first predetermined slope,
    wherein, data is encoded by an offset of the starting frequency of subsequent chirp signals.

11. The method of claim 10 wherein the first chirp signal and the second chirp signal are being transmitted asynchronously.

12. The method of claim 10 wherein the slope of the second chirp signal opposes the first predetermined slope.

13. The method of claim 10 wherein the slope of the second chirp signal having the same polarity and different magnitude from the first predetermined slope.

14. The method of claim 10 wherein the slope of the second chirp signal having a different polarity and different magnitude from the first predetermined slope.

15. A multiple access chirp radio communication system operable in a geographic area comprising a first type of receivers and transmitters for receiving and transmitting chirp signals of a first slope and a second type of receivers and transmitters for receiving and transmitting chirp signals of a second slope, wherein data is encoded by an offset of the starting frequency of a subsequent chirp signal.

16. A multiple access chirp radio communication system operable in a geographic area comprising plural types of receivers and transmitters for receiving and transmitting chirp signals, each type of receiver and transmitter receiving and transmitting a chirp signal of a different slope, wherein data is encoded by an offset of the starting frequency of a subsequent chirp signal.

17. A multiple access chirp radio communication system for communicating data encoded in a chirp signal comprising:
    a plurality of base stations, said plurality of base stations comprising at least one base station of a first type and at least one base station of a second type;
    each of said plurality of base stations comprising a transmitter and a receiver both of the same type as the respective base station;
    a first type mobile station with a first type receiver and a first type transmitter capable of wireless communication with the at least one base station of the first type; and,
    a second type mobile station with a second type receiver and a first type transmitter capable of wireless communication with the at least one base station of the second type;
    wherein the first type base station and the first type mobile station are configured for wireless communication with a first type of chirp signal having a positive slope and the second type of base station and the second type mobile station are configured for wireless communication with a second type of chirp signal having a negative slope;

wherein the first type of chirp signal and the second type of chirp signals are in the same frequency band;

wherein the first type receiver comprises a first type of correlator for detecting the first type of chirp signal and the second type of receiver comprises a second type of correlator for detecting the second type of chirp signal;

wherein the data is encoded on the first or second types of chirps signals by starting subsequent chirps of the first of second types of chirp signals at frequencies different from the nominal frequency by a specific amount.

18. In a multiple access chirp radio communication system with a plurality of mobile transmitters, a method of discriminating between plural types of mobile transmitters transmitting chirp signals of different slopes over independent transmission paths within a same frequency band comprising the steps of:

(a) receiving a chirp signal;

(b) detecting the slope of the received chirp signal; and, (c) determining mobile transmitter type as a function of the detected chirp slope.

* * * * *